United States Patent

Yamaguchi

[11] Patent Number: 5,725,170
[45] Date of Patent: Mar. 10, 1998

[54] FILM CARTRIDGE

[75] Inventor: Takuji Yamaguchi, Wakayama, Japan

[73] Assignee: Noritsu Koki Co., Ltd., Wakayama, Japan

[21] Appl. No.: 655,826

[22] Filed: May 31, 1996

[30] Foreign Application Priority Data

Jun. 13, 1995 [JP] Japan ................. 7-145862

[51] Int. Cl.$^6$ ............................................ G03B 17/26
[52] U.S. Cl. ............................................ 242/348.1
[58] Field of Search ............... 242/348, 348.1, 242/348.3, 348.4, 535.1, 539, 332.7; 396/512, 513, 514

[56] References Cited

U.S. PATENT DOCUMENTS

| | | | |
|---|---|---|---|
| 4,218,032 | 8/1980 | Nagel et al. | 242/539 |
| 4,504,026 | 3/1985 | Serizawa et al. | |
| 5,232,175 | 8/1993 | Zander et al. | 242/348.4 |
| 5,251,839 | 10/1993 | Zander et al. | 242/348 |
| 5,265,819 | 11/1993 | Enomoto et al. | 242/348 |
| 5,277,374 | 1/1994 | Zander et al. | |
| 5,320,300 | 6/1994 | Gorman et al. | |
| 5,476,232 | 12/1995 | Kataoka et al. | 242/348.4 |

FOREIGN PATENT DOCUMENTS 39 08 780  11/1989  Germany.

*Primary Examiner*—John M. Jillions
*Attorney, Agent, or Firm*—Wenderoth, Lind & Ponack

[57] ABSTRACT

A film cartridge permits efficient resetting of a film stored in a film container. A cover is mounted on a cartridge body so as to be movable between an open position and a closed position. In the closed position, a film storage space is defined by the cover and the cartridge body. A film inlet/outlet slit communicates with the outside of the film storage space. A mounted in the film storage space are a spool and a guide plate for guiding a film inserted into the film storage space onto the outer periphery of the spool. The guide plate is pivotally supported. A roller is rotatably mounted on the end of the guide plate opposite the outer periphery of the spool. The guide plate is biased by a spring so that the roller is pressed against the spool. A film inserted through the film inlet/outlet into the film storage space is guided into between the spool and the roller by the guide plate. The spool is rotated in this state to wind the film around the spool.

9 Claims, 5 Drawing Sheets

FILM CARTRIDGE

BACKGROUND OF THE INVENTION

This invention relates to a film cartridge used when developing an exposed film stored in a film container.

Photographic films which can be developed with automatic film developing machines include type 110, 120, 126 and 135 films. Among these different types of films, to develop a type 135 film, its container or patrone is set in a film setting section in an automatic film developing machine. The film is then fed out of the patrone into the developing unit.

To develop a film other than type 135 films, it has to be reset from its patrone into a film cartridge. Once the film is reset in the cartridge, it is set in the film setting section to feed the film out of the cartridge into the developing unit.

A leader in the form of a synthetic resin sheet is connected to the leading end of each film to feed the film into the developing unit with the leader as a guide.

A typical conventional film cartridge for resetting e.g. a type 110 film has a cartridge body and a cover mounted to the cartridge body so as to be movable between an open position and a closed position. When the cover is in the closed position, it defines a film storage space in cooperation with the cartridge body, and a film inlet/outlet communicating with the outside of the film storage space.

Such film cartridge has no spool for winding a film therearound. In order to store a film in this cartridge, the film pulled out of the film container has to be manually wound spirally outside the film cartridge. The film thus wound is set in the cartridge. This operation is extremely troublesome.

Also, it is difficult to tightly wind a film taken out of a film container. Even if the film is somehow wound tightly, the moment the film is set in the cartridge body, the film will slacken due to its own resilience and its diameter will increase until it touches the inner peripheral surface of the cartridge body or the cover. Since the film is subsequently pulled out of the cartridge in this state, its frames (and the images thereon) tend to be damaged.

An object of this invention is to provide a film cartridge which can automatically wind films therein, and which can wind and unwind films without damaging them.

SUMMARY OF THE INVENTION

According to this invention, there is provided a film cartridge comprising a cartridge body having a pair of end plates, a front plate provided between the pair of end plates, and an outwardly extending film inlet forming plate integrally provided at the top end of the front plate. A cover is mounted to the cartridge body so as to be movable between an open position and a closed position. The cover defines a film storage space in cooperation with the cartridge body and a film inlet/outlet port in cooperation with the film inlet forming plate when the cover is in the closed position. A retaining means retains the cover in the closed position. A spool is mounted in the film storage space and has both ends thereof supported on the end plates so as to be rotated by driving it from the outside. A guide plate is pivotably supported to guild a film inserted through the film inlet/outlet port onto the outer periphery of the spool. The guide plate has one end thereof resiliently pressed against the outer periphery of the spool for pressing the film against the spool.

To press the end portion of the guide plate against the outer periphery of the spool, the resilience of the guide plate itself may be utilized, or otherwise a separate resilient member may be used.

A roller may be rotatably mounted on the end portion of the guide plate so as to be pressed against the outer periphery of the spool.

The retaining means may comprise a pair of resilient claws provided on both sides of the cover at its end adapted to abut the film inlet forming plate, the claws being engageable with both sides of the bottom surface of the film inlet forming plate.

In order to reset a film in the film cartridge, the cover is opened, and the leading end of a film pulled out of a film container is inserted into the film inlet/outlet until the leading end is caught between the spool and the end portion of the guide plate. The spool is rotated in this state to wind the film around the spool. When the tail end of the film comes out of the film container, the film is cut off at the tail end from the film container.

The cover may be opened by pushing up the tips of the claws while holding the cartridge body, or by pushing down the tops of the end plates while supporting the tips of the claws and a coupling portion between the cover and the cartridge body. In this way, the cover can be opened extremely easily.

Means are provided to shield the film against light while the film is being inserted into the cartridge. Once the film is set in the cartridge body, the cover is closed to prevent the entry of light.

Other features and objects of the present invention will become apparent from the following description made with reference to the accompanying drawings, in which:

DETAILED DESCRIPTION OF THE PREFERRED EMBODIMENTS

Embodiments of this invention are described with reference to the accompanying drawings.

Figure 1:
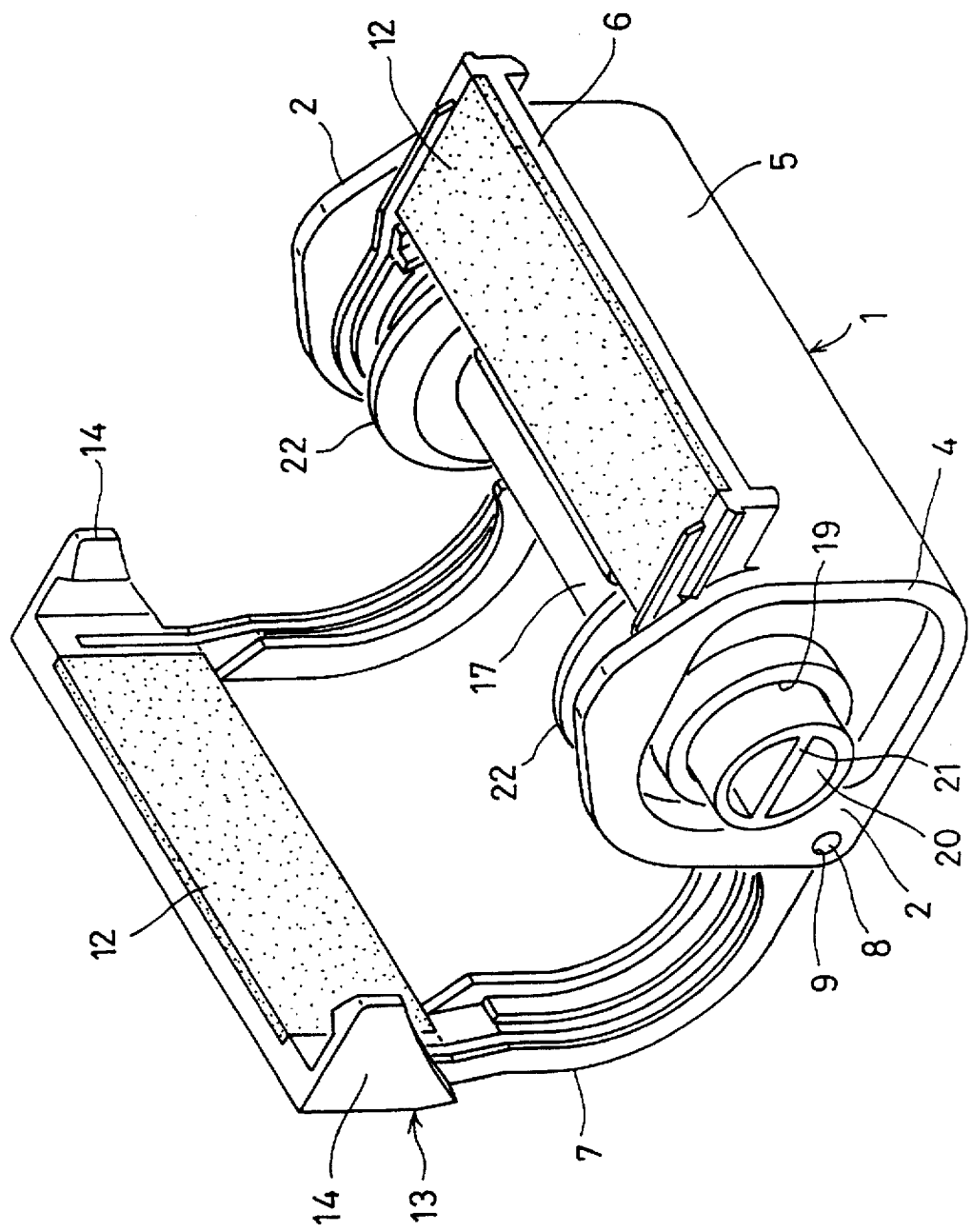
FIG. 1 is a perspective view of an embodiment of the film cartridge according to this invention.
Figure 2:
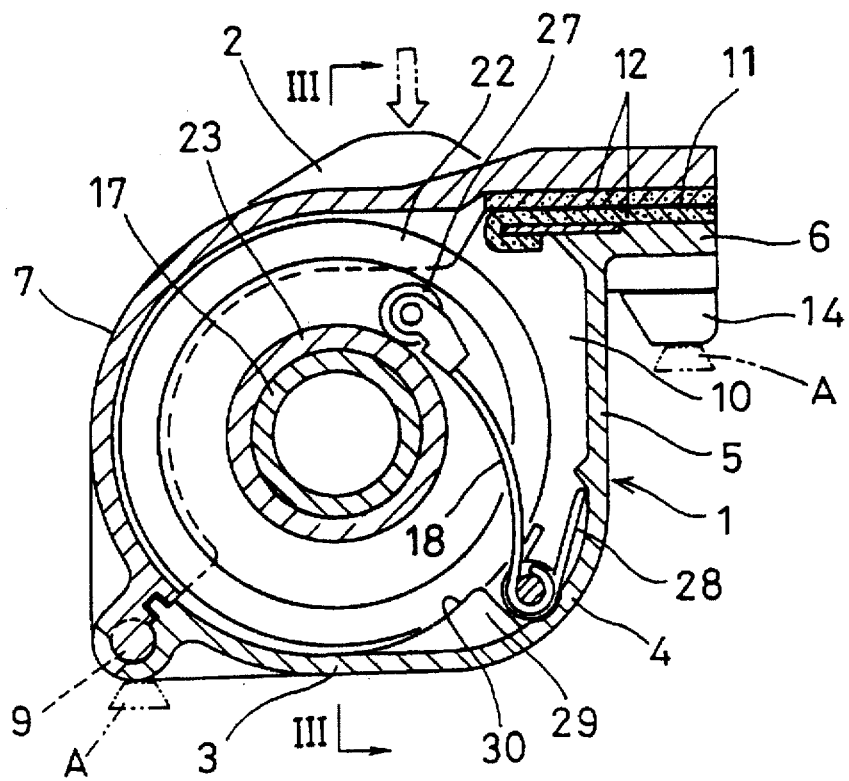
FIG. 2 is a sectional view in which a cover is closed.
Figure 3:
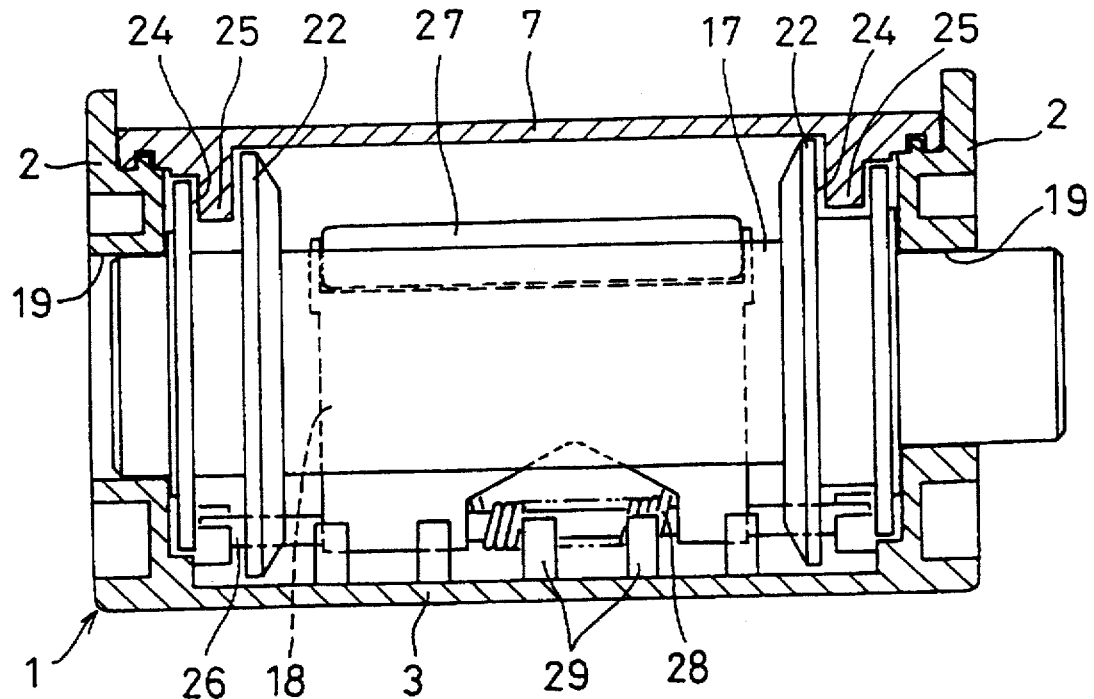
FIG. 3 is a sectional view taken along line III—III of FIG. 2.

Referring first to FIGS. 1-3, a cartridge body 1 has a pair of end plates 2 and a bottom plate 3 extending between the bottom ends of the end plates 2. A front plate 5 is integrally connected to the bottom plate 3 through an arcuate portion 4. An outwardly extending film inlet forming plate 6 is integrally provided on the top end of the front plate 5.

A cover 7 has one end pivotally coupled to the rear end of the bottom plate 3 by inserting a pin 8 provided at one end of the cover 7 into a pin hole 9 formed in the rear end of the bottom plate 3.

The cover 7 can be pivoted about the pin hole 9 between an open position and a closed position. In the closed position shown in FIG. 2, a film storage space 10 is defined by the cover 7 and the cartridge body 1, while a film inlet/outlet slot 11 is defined between the front end of the cover 7 and the film inlet forming plate 6. In the film inlet/outlet slot 11, upper and lower soft light shield films 12 are provided. When the cover 7 is closed, the light shield films 12 come into close contact with each other, blocking the entry of light into the cartridge.

Figure 5:
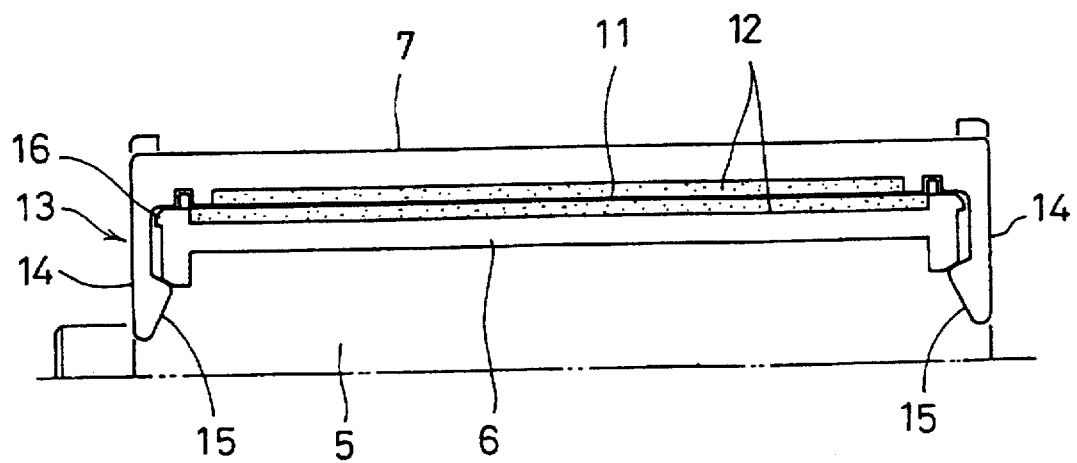
FIG. 5 is a front view of a film inlet/outlet of the same.

A cover retaining mechanism 13 is provided to keep the cover 7 in its closed position. As shown in FIG. 5, the cover retaining mechanism 13 includes a pair of resilient claws 14 provided on both sides of the cover 7 at its end adapted to abut the film inlet forming plate 6. Each claw 14 has an inner tapered surface 15 at its tip. When the cover 7 is closed, the claws 14 engage both sides of the bottom surface of the film inlet forming plate 6, locking the cover 7 in its closed position.

Figure 7:
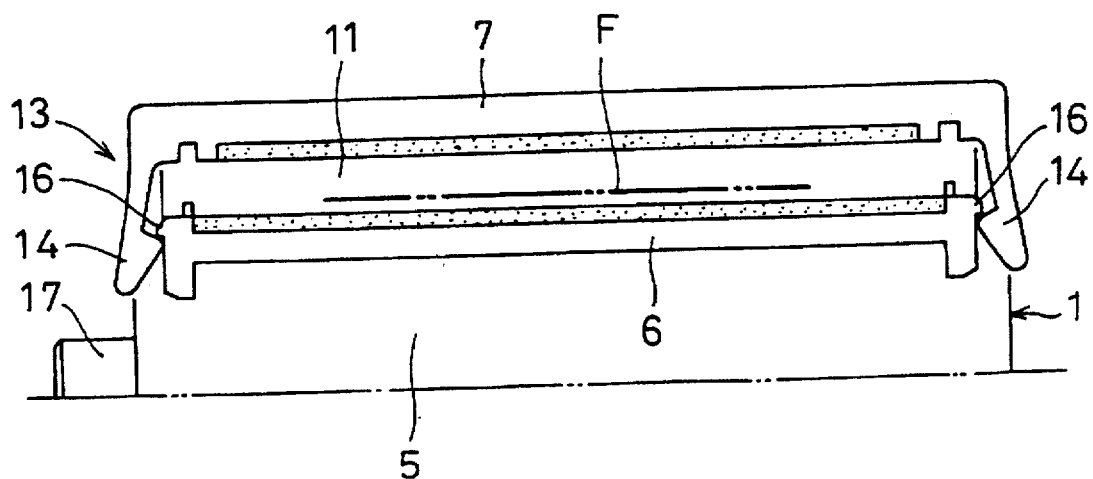
FIG. 7 is a front view of the film inlet/outlet of FIG. 6.

Engaging portions 16 are formed on both sides of the film inlet forming plate 6 along top edges thereof. When the claws 14 are in engagement with the engaging portions 16, the cover 7 is kept in a half-open position (FIG. 7).

The engaging portions 16 may be protrusions as shown or recesses.

A spool 17 and a guide plate 18 are mounted in the film storage space 10 defined by the cartridge body 1 and the cover 7. A film inserted through the film inlet/outlet slot 11 into the film storage space 10 is guided by the guide plate 18 onto the spool 17.

As seen in FIGS. 1 and 3, the spool 17 is rotatably supported on the end plates 2 by inserting both ends of spool 17 in holes 19 formed in the end plates 2. One end of spool 17 extends through one of the holes 19 so that this end protrudes from the end plate 2. A hole 20 is formed in each end of the spool 17. A torque transfer rib 21 is provided in each hole 20.

The spool 17 is also provided with a pair of flanges 22 located in the film storage space 10 and spaced from each other by a distance equal to or greater than the width of a film to be wound on the spool. A sleeve 23 made of a resilient material such as rubber is put on the spool 17 between the flanges 22 to prevent a film wound on the spool from slipping.

The flanges 22 are formed with annular grooves 24 in their outer circumferences (FIG. 3). When the cover 7 is closed, ribs 25 formed on the inner surface of the cover 7 on both sides fit in the annular grooves 24, preventing the passage of light through the space between the cover 7 and the flanges 22.

Figure 4:
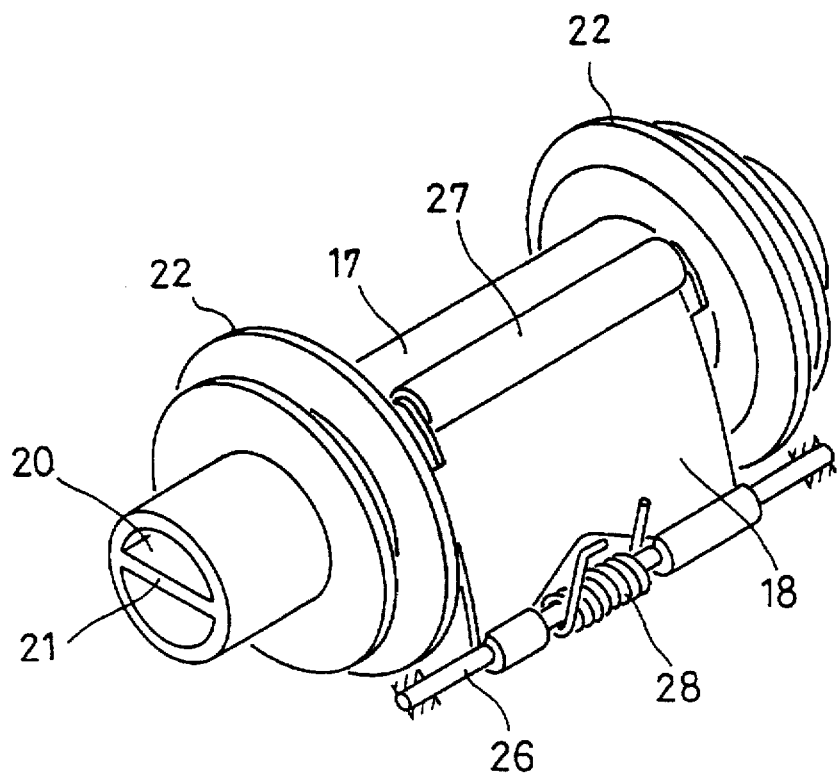
FIG. 4 is a perspective view of a guide plate of the same.

Referring to FIG. 4, the guide plate 18 is pivotally supported on a shaft 26 provided at the bottom of the film storage space 10 and carries a roller 27 at its end near the spool 17.

A spring 28 supported on the shaft 26 biases the roller 27 to press it against the outer periphery of the spool 17.

As shown in FIGS. 2 and 3, a plurality of guide pieces or members 29 are provided in front of the guide plate 18. They have arcuate guide edges 30 along which a film is guided toward the guide plate 18.

To transfer a film wound on a spool in a film container into the film cartridge of this embodiment, the spool of the film container is rotated to feed the film out of the container until the leading end of the film passes through the film inlet/outlet slot 11 and is caught between the spool 17 and the roller 27 in the film storage space 10. In this state, the rotation of the spool in the film container is stopped, and the spool 17 of the film cartridge is rotated to wind the film around it.

The spool 17 may be rotated manually or by a motor. In the latter case, a bifurcated end is provided on the tip of the drive shaft of the motor, and the bifurcated end may be brought into engagement with the torque transfer rib 21 at one end of the spool 17.

When inserting a film into the slot 11, the cover 7 is kept in the half-open position by engaging the claws 14 with the engaging portions 16 (FIG. 7).

To half-open the cover 7, tops of the end plates 2 are pushed down as shown by the arrow in FIG. 2 with the tips of the claws 14 and the coupling portion between the cover 7 and the cartridge body 1 supported on support members A shown by chain lines in FIG. 2. Otherwise, tips of the claws 14 are pushed up while holding the cartridge body 1.

Figure 6:
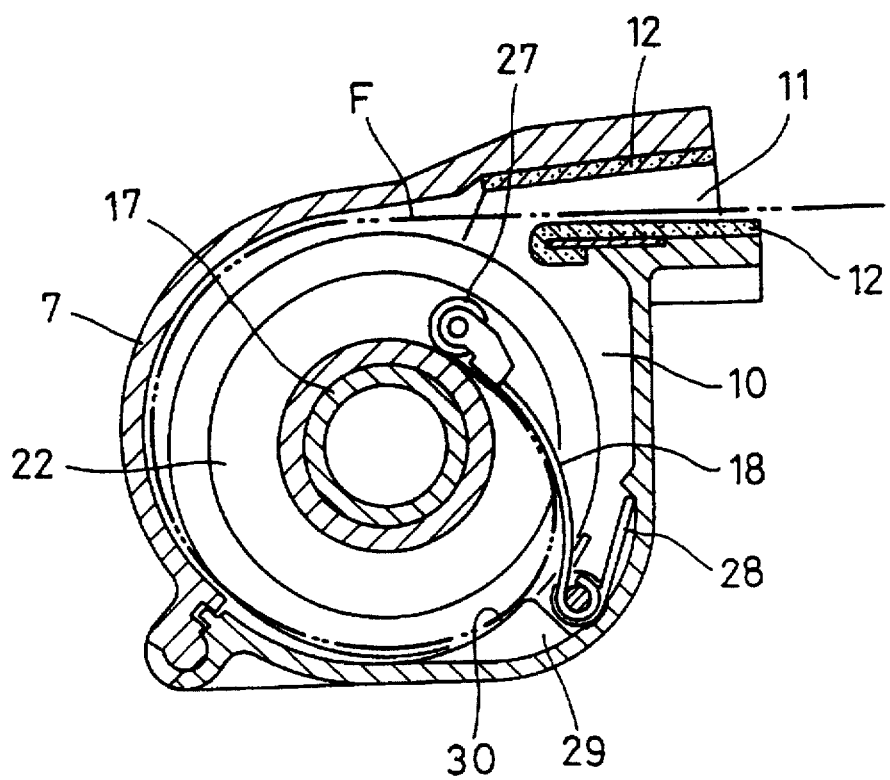
FIG. 6 is a sectional view of an same showing the initial stage of a film winding step.

When the end of a film F is inserted into the film storage space 10 through the half-opened slot 11, it is guided by the guide plate 18 and caught between the spool 17 and the roller 27 as shown in FIG. 6. With the film F caught between the spool 17 and the roller 27, the spool 17 is rotated to wind the film around the spool 17.

When the trailing end of the film F comes out of the film container, it is cut off from the film container. The cover 7 is then closed to engage the claws 14 with both sides of the bottom surface of the film inlet forming plate 6.

If the film cartridge had a plurality of guide plates 18 and rollers 27, the end of a film that has passed between a first roller and the spool would spring back in a tangential direction of the spool due to its resilience. The film end would abut a second guide plate in this state and be guided between a second roller and the spool. The film would thus slacken between the first and second rollers and would be wound around the spool in a slackened state.

In contrast, the film cartridge of the invention has a single guide plate 18 and a single roller 27, so that a film can be wound tightly around the spool.

When a film F has been wound around the spool, the roller 27 resiliently presses the film F, preventing the film from slackening. Since the film is tightly wound around the spool, it is possible to prevent the film from touching the inner surface of the cartridge body 1 or the cover 7 when feeding it out of the cartridge.

To develop the film wound around the film cartridge, the film F is fed out of the cartridge with the cover 7 half opened by keeping the claws 14 in engagement with the engaging portions 16.

In an automatic film developing machine, when a film has been fed into its developing unit, the film cartridge is automatically ejected. If the cover 7 were fully open when the cartridge is ejected, it might get stuck while being ejected.

In the arrangement of the invention, the cover 7 is not fully but only half open when the film is fed out of the cartridge. Thus, the cartridge is least likely to get stuck while being ejected.

It is preferable that the film cartridge for winding a type 110 film has the same size as a patrone for winding a type 135 film. Such a film cartridge can be set in a patrone holder provided in the film setting section of the automatic film developing machine. With this arrangement, it is possible to efficiently develop two types of films, i.e. type 135 and type 110 films, one after another.

Figure 8:
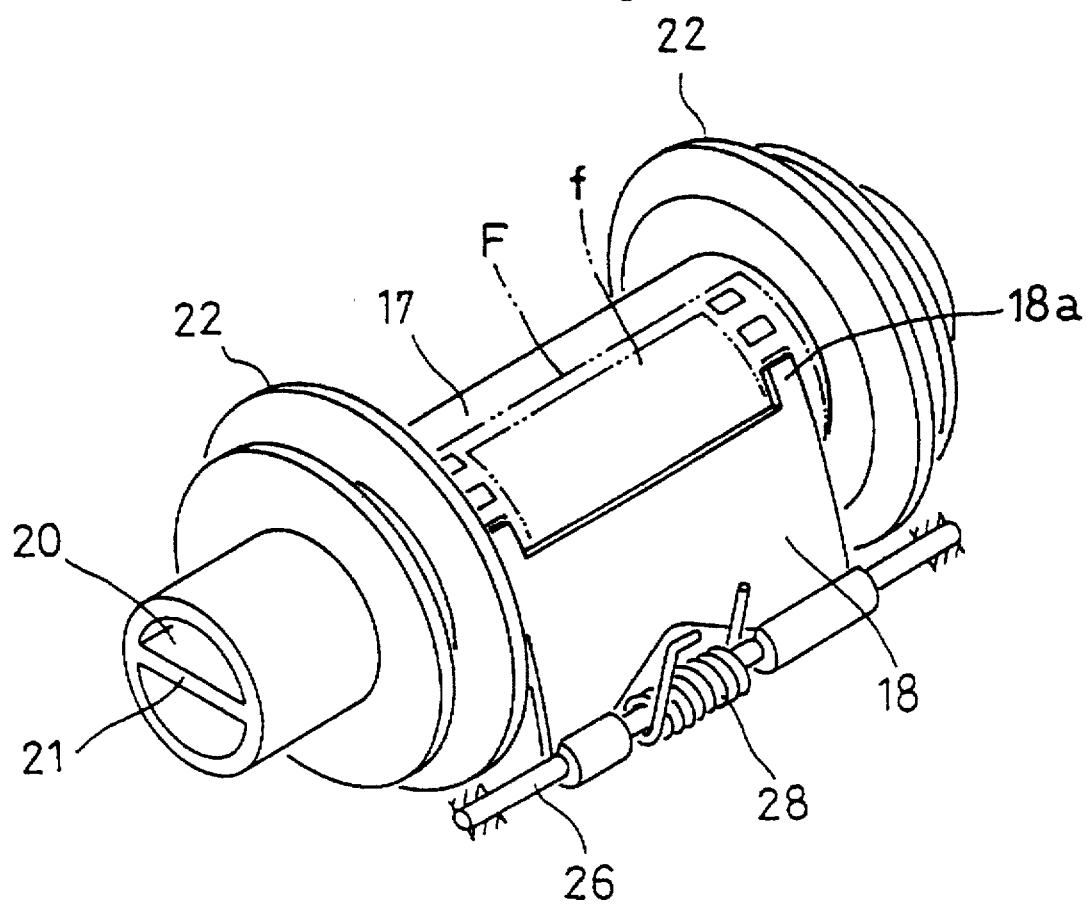
FIG. 8 is a perspective view of another embodiment of the film cartridge according to this invention.

FIG. 8 shows another embodiment of this invention. In this embodiment, instead of the roller 27 shown in FIG. 2, the guide plate 18 has protrusions 18a on its front corners. They are resiliently pressed toward the outer periphery of the spool 17 and press the margins of a film F on both side of its frames f against the spool 17.

Thus, as in the first embodiment, a film can be wound and unwound without damaging its frames.

According to this invention, it is possible to reset a film in the film cartridge without damaging its frames. It is also possible to automate resetting of films.

Films can be wound tightly around the spool, so that they will never touch the inner surface of the cartridge body or the cover when they are pulled out of the cartridge. Thus, it is possible to prevent damage to the film frames.

What is claimed is:

1. A film cartridge comprising:

a cartridge body including a pair of end plates, a front plate extending between said end plates, and a film inlet forming plate integral with and extending outwardly from a top end of said front plate;

a cover mounted to said cartridge body to be movable relative thereto between an open position and a closed position;

retaining means for retaining said cover in said closed position;

said cover defining, when in said closed position, a film storage space with said cartridge body and a film inlet/outlet port with said film inlet forming plate;

a spool mounted in said film storage space and having opposite ends supported on said end plates and capable of being driven from outside thereof;

a guide plate pivotally supported at a first end thereof for guiding a film inserted through said film inlet/outlet port onto an outer periphery of said spool, said guide plate having a second end resiliently pressed toward said outer periphery of said spool for pressing the film against said spool; and guide members positioned upstream of said first end of said guide plate, relative to a direction of winding the film on said spool, said guide members having guide edges to smoothly guide a leading end of the film toward said guide plate.

2. A film cartridge as claimed in claim 1, further comprising a resilient member biasing said guide plate to press said second end thereof toward said cutter periphery of said spool.

3. A film cartridge as claimed in claim 1, further comprising a roller mounted rotatably on said second end of said guide plate to be pressed toward said outer periphery of said spool.

4. A film cartridge as claimed in claim 1, wherein said retaining means comprises a pair of resilient claws provided at opposite ends of a portion of said cover confronting said film inlet forming plate, said claws being engageable with bottom surfaces of opposite ends of said film inlet forming plate.

5. A film cartridge as claimed in claim 4, wherein said film inlet forming plate further has at said opposite ends thereof engaging portions to be engaged by said claws.

6. A film cartridge as claimed in claim 4, wherein said claws are sufficiently resilient to enable disengagement thereof by bending tips thereof.

7. A film cartridge as claimed in claim 1, having an outer size substantially the same as a patrone for winding a type 135 film ehen said cover is in said closed position.

8. A film cartridge as claimed in claim 1, wherein said end plates are sufficiently resilient to enable disengagement of said cover by pressing on tops of said end plates.

9. A film cartridge as claimed claim 1, wherein said cartridge body has an inner peripheral surface configured to guide the leading end of the film toward said guide members.

* * * * *